United States Patent
Wilson (10) Patent No.: US 8,585,008 B2
(45) Date of Patent: Nov. 19, 2013

(54) ADJUSTABLE FLUSH SYSTEM

(75) Inventor: John R. Wilson, Naperville, IL (US)

(73) Assignee: Sloan Valve Company, Franklin Park, IL (US)

( * ) Notice: Subject to any disclaimer, the term of this patent is extended or adjusted under 35 U.S.C. 154(b) by 631 days.

(21) Appl. No.: 12/788,668

(22) Filed: May 27, 2010

(65) Prior Publication Data

US 2010/0299821 A1 Dec. 2, 2010

Related U.S. Application Data

(60) Provisional application No. 61/182,529, filed on May 29, 2009.

(51) Int. Cl.
*F16K 31/12* (2006.01)

(52) U.S. Cl.
USPC ............................... 251/42; 4/324

(58) Field of Classification Search
USPC ............. 4/324; 251/21, 40, 42; 137/270
See application file for complete search history.

(56) References Cited

U.S. PATENT DOCUMENTS

| | | | |
|---|---|---|---|
| 605,621 A | 6/1898 | Acklin |
| 1,114,398 A | 10/1914 | Sloan |
| 1,255,587 A | 2/1918 | Tamble |
| 1,519,654 A | 12/1924 | Banta |
| 1,624,130 A | 4/1927 | Beggs |
| 1,868,520 A | 7/1932 | Brooks |
| 1,868,591 A | 7/1932 | Tanner |
| 1,896,950 A | 2/1933 | Groeniger |
| 1,912,937 A | 6/1933 | George |
| 2,038,135 A | 4/1936 | Sloan |
| RE20,576 E | 12/1937 | Sloan |
| 2,136,221 A | 11/1938 | Sloan |
| 2,164,760 A | 7/1939 | Wesson |
| 2,210,860 A | 8/1940 | Regnell |
| 2,369,104 A | 2/1945 | Fredrickson |
| 2,472,576 A | 6/1949 | Dobrick |
| 2,612,187 A | 9/1952 | Romanelli et al. |
| 2,620,826 A | 12/1952 | Johns |
| 2,633,141 A | 3/1953 | Russell |
| 2,734,712 A | 2/1956 | Fraser |
| 2,738,946 A | 3/1956 | Filliung |

(Continued)

FOREIGN PATENT DOCUMENTS

| | | |
|---|---|---|
| CN | 101089303 | 12/2007 |
| CN | 101334003 | 12/2008 |
| WO | WO 2004/090400 A1 | 10/2004 |
| WO | WO 2005/124210 A1 | 12/2005 |

OTHER PUBLICATIONS http://www.merriam-webster.com/dictionary/bushing. Feb. 2013.*

(Continued)

*Primary Examiner* — John K Fristoe, Jr.
*Assistant Examiner* — R. K. Arundale
(74) *Attorney, Agent, or Firm* — Foley & Lardner LLP (57) ABSTRACT

A flush valve assembly having a handle assembly positioning bushing for spacing a handle assembly within an opening of the flush valve assembly. The handle assembly positioning bushing having an eccentric opening for receiving the handle such that rotation of the handle assembly positioning bushing with regard to the flush valve assembly body alters the height of the handle assembly and, thus, the volume of water passing through the flush valve assembly during a flush cycle.

12 Claims, 8 Drawing Sheets

(56) References Cited

U.S. PATENT DOCUMENTS

| | | | |
|---|---|---|---|
| 3,085,779 | A | 4/1963 | Philippe |
| 3,207,467 | A | 9/1965 | Buhler |
| 3,399,860 | A | 9/1968 | Billeter |
| 3,406,940 | A | 10/1968 | Kertell |
| 3,594,828 | A | 7/1971 | Seek |
| 3,695,254 | A | 10/1972 | Blum |
| 3,778,023 | A | 12/1973 | Billeter |
| 3,791,618 | A | 2/1974 | Nelson et al. |
| 3,806,962 | A | 4/1974 | Sievers |
| 4,022,380 | A | 5/1977 | Scragg |
| 4,134,570 | A | 1/1979 | Walker |
| 4,202,525 | A | 5/1980 | Govaer et al. |
| 4,272,052 | A | 6/1981 | Gidner |
| 4,327,891 | A | 5/1982 | Allen et al. |
| 4,576,272 | A | 3/1986 | Morgan, Jr. et al. |
| 4,817,913 | A | 4/1989 | Whiteside |
| 4,883,254 | A | 11/1989 | Whiteside |
| 5,026,021 | A | 6/1991 | Pino |
| 5,415,374 | A | 5/1995 | Carroll et al. |
| 5,431,181 | A | 7/1995 | Saadi et al. |
| 5,476,244 | A | 12/1995 | Carroll et al. |
| 5,505,427 | A | 4/1996 | Whiteside |
| 5,730,415 | A | 3/1998 | Gronwick |
| 5,881,993 | A | 3/1999 | Wilson et al. |
| 6,019,343 | A | 2/2000 | Tsai |
| 6,299,127 | B1 | 10/2001 | Wilson |
| 6,408,873 | B1 | 6/2002 | Hall et al. |
| 6,785,913 | B2 | 9/2004 | Ho |
| 6,905,108 | B2 | 6/2005 | Hall et al. |
| 6,966,536 | B2 | 11/2005 | Enomoto et al. |
| 7,481,413 | B2 | 1/2009 | Funari |
| 7,607,635 | B2 | 10/2009 | Wilson |
| 8,033,522 | B2 * | 10/2011 | Wilson ............................ 251/40 |
| 8,292,257 | B2 * | 10/2012 | Maercovich ..................... 251/40 |
| 8,322,682 | B2 * | 12/2012 | Maercovich ..................... 251/40 |
| 2006/0033060 | A1 * | 2/2006 | Funari ............................. 251/40 |
| 2006/0202141 | A1 | 9/2006 | Perlstein |
| 2007/0210271 | A1 | 9/2007 | Wilson |
| 2007/0272887 | A1 | 11/2007 | Carroll et al. |
| 2009/0007319 | A1 | 1/2009 | Funari et al. |
| 2010/0299821 | A1 * | 12/2010 | Wilson .............................. 4/324 |
| 2011/0083260 | A1 * | 4/2011 | Maercovich ...................... 4/324 |

OTHER PUBLICATIONS http://education.yahoo.com/reference/dictionary/entry/secure. Feb. 2013.*

"Uppercut™ The Fastest Way to Start Saving Water!, " Dual-Flush Flushometer WES-111 advertisement, Sloan Valve Company, Oct. 2005.

ASME A112.19.2-2003, "Vitreous China Plumbing Fixtures and Hydraulic Requirements for Water Closets and Urinals," The American Society of Mechanical Engineers, 2004, pp. i-viii, and pp. 1-59.

ASME A112.19.14-2006, "Six-Liter Water Closets Equipped with a Dual Flushing Device," The American Society of Mechanical Engineers, 2006, pp. ii-vi and pp. 1-2.

"Testing of Positioning of Actuator Rod from Cook Mechanism, Affect on Flow," test data from 1987 test, Zurn Industries, Mar. 19, 1987 pp. 1-6.

ASME A112.19.14-2001, "Six-Liter Water Closets Equipped with a Dual Flushing Device," The American Society of Mechanical Engineers, Aug. 1, 2002, pp. i-ix and 1-3.

Chinese office action and search report for Chinese patent application No. 201080023468.2, issued Jan. 22, 2013, 15 pages.

Sloan Flush Valves, Catalog 32, "The Naval Flush Valve," Installation Data, Sloan Valve Company Chicago II pp. 26 and 40, 1932.

Sloan Flush Valves, Catalog 40, "Naval Repair Parts and Installation,", Sloan Valve Company, Chicago, II, pp. 26 and 31, 1940.

* cited by examiner

ADJUSTABLE FLUSH SYSTEM

CROSS-REFERENCE TO RELATED PATENT APPLICATIONS

This application claims priority to U.S. Provisional Application No. 61/182,529, filed May 29, 2009, which is hereby incorporated by reference.

FIELD OF THE INVENTION

The present invention is directed towards flushometers. More particularly, the present invention is directed to systems and methods for adjusting the volume of water passing through a flushometer during a flush cycle.

BACKGROUND OF THE INVENTION

At the present time plumbing products are continually being required to consume less water without quality of performance. The plumping industry has adopted the term High Efficiency ("HE") to describe the fixtures, whether urinal (HEU) or water closet (HEC). This has ushered in a whole new series of fixtures, i.e. the actual structural component such as urinal or toilet, typically ceramic china, designed to minimize water usage without adverse impact on performance. In addition these new fixtures, the components that control the flush have also seen changes to minimize water usage. In fact, as the amount of water being used to flush a fixture is reduced, the precision (such as the tolerances for the component) of the individual components becomes increasingly important. For example, a urinal designed to flush only a pint of water may not operate properly when utilized with a flush valve that provides a gallon of water per flush. Likewise, a one pint flush valve may not provide sufficient water to rinse a urinal fixture that was designed to have a one gallon flush volume.

In commercial applications fixtures are supplied with pressurized water in large diameter supply pipes using flushometers which afford quick reset and maximum power to completely clear out fixtures. The pressurized water and large diameter pipes allow the fixture to operate at high pressure and high flow rates. To deal with varying water supply conditions, popular flushometers come with a localized stop shut off attached to the flushometer valve. This localized stop shut off allows an installer to adjust the water volume in order to maximize bowl performance. In the past when flushometers delivered many gallons of water (~3 to 5 gallons per flush) system requirements, such as water pressure and water flow, were fairly forgiving, as the flushometer had a longer cycle to overcome any problems with the water delivery system. With lower flow fixtures of today (1.6 gpf and lower) marginal water delivery system (upstream fresh water pipes) can cause a flushometer and fixture to perform poorly and in some instances fail to fully evacuate the bowl. In the prior art, the primary way to adapt to the water supply variables was the stop to adjust water flow.

Fitting and fixture manufacturers assume minimum pressures and flows within a system, but many fresh water delivery systems are operating marginally because of building expansion beyond the original piping limits and deteriorating water pressure/water flow. This will cause a flushometer and fixture to need a little adjustment because of the job site location in order to "dial in" the fixture to the unique operating infrastructure of the building's water supply system. At the opposite end of this problem are water agencies who discourage any adjustment whatsoever on a flushing device, but who also realize performance must not be sacrificed. Some local codes even go so far as to call out no 'external' adjustment, though external adjustments allow for some small opportunity for adjustment internal to the flush valve.

The sum total of a fixture's efficiency is not generally viewed only in terms of total gallons flushed, but the distribution of that total flush volume to maximize waste extraction while maintaining refill and trap seal of the bowl. Much has been taught over the years about the adjustments that can be made to the flushometer once one skilled in the art of installation has the valve on a particular job site and needs to dial it in to the unique operating characteristics of the building's water supply system. Adjustments to piston stroke and venting times have been taught and they cover a variety of approaches to affect the flush volume from a standard nominal volume of a particular valve. Flushometers are metering devices that not only deliver the correct total volume of water per cycle, but also deliver the correct incremental volume at the correct time during the short flush cycle. This is further accomplished with a relative fixed volume over a wide pressure range. This balance of water volume at the correct moment for the fixture hydraulics is achieved by a precise orchestration of contributing elements of the flushometer, beyond simple timing of the venting. Those skilled in the art realize changing the vent timing is but one way to effect flushing volume. Vent timing, fixed bypass size, refill, and flow are also key elements in controlling the water delivery to a fixture.

Also critical in the performance of these types of valves is the body, which is typically machined out of brass. It has been known in the art that varying the height at which the plunger strikes the relief valve stem will alter the venting time of the flush valve. Of great importance is the critical flushometer dimension between the handle assembly centerline (or more accurately, the centerline of the plunger tip that strikes the valve stem) in the flush valve assembly body handle opening and the seat for the relief valve. The position of the handle assembly within the handle opening also controls the height at which the plunger strikes against the relief valve stem (alternatively called the "gland" in the prior art) of the internal flushing kit (such as a piston or diaphragm kit) and controls the vent time of the control chamber and hence the amount of water per flush the valve will deliver.

In the current market there are water conservation service companies that audit commercial building's water consumption and come up with various approaches to saving water. These companies look to change out complete fittings and fixtures, while other companies conserve costs and only sell low flushing kits to put into the flushometer valves salvaging the existing installed fixtures. In the audit process, for those flushometer valves that do not have an external adjustment, alternate flushing kits have to be installed that "approximate" peak performance but sacrifice some marginal water savings. Each of these alternative kits provides a slight change to flush profile. It should be appreciated that in order to optimize each fixture, an installer may need to try several kits and utilize different kits in different fixtures. In the event that the underlying factors such as water flow changes, for example where a restroom is added to a building or where water consumption is greatly reduced, it would be necessary to change out the kits entirely. Some flow adjustment can be effected by throttling the control stop, but the primary water volume change is controlled by the new kit in the same flush valve assembly body.

For these service companies, having an adjustable setting on the valve ("Dial a Flush") during install would be optimal. Having this dial a flush feature, old fixtures can be flushed effectively using less water and adjusting each fixture with just the right flow/volume and reduced gpf to evacuate on less water without installing a new fixture. The actual flushing parameter adjustment can be a continuum of options to meet the needs of each individual installation and not be limited to selected discrete flushing kits. The overall effect of water savings over a large population of fixtures in a building is thereby achieved.

SUMMARY

In one embodiment, the invention includes a handle assembly positioning bushing adapted to engage the handle opening of a flushometer valve assembly. A handle assembly is positioned by the bushing, altering the location that a plunger of the handle assembly strikes a valve stem, thereby altering the venting time of the flushometer valve.

The handle assembly positioning bushing has a passage that is eccentrically positioned within the bushing such that the passage has a central axis different than that of the entire handle assembly positioning bushing. Once placed in the body handle opening, a standard flushometer handle assembly is secured into the handle assembly positioning bushing onto the flushometer. Thus, in one embodiment, the central longitudinal axis of the bushing passage and the central longitudinal axis of the handle assembly are substantially coaxial and the central longitudinal axis of the entire handle assembly positioning bushing and the central longitudinal axis of the handle opening are substantially coaxial. In one embodiment, the flushometer shows no external indication of the presence of the handle assembly positioning bushing and the bushing is not externally adjustable.

The handle assembly is guided into the passage of the handle assembly positioning bushing such that the handle assembly extends through the bushing and is positioned within the handle opening by the bushing such that the central longitudinal axis of the plunger is parallel to but nonaxisymmetric with the central longitudinal axis of the handle opening. The relative position of the plunger axis to the handle opening axis (and to the relief valve stem whose position is static with respect to the handle opening) may be altered by rotating the handle assembly positioning bushing within the handle opening. By altering the relative position of the plunger, the position that the plunger strikes the relief valve stem can be changed, thus providing for selective control of the vent time of the flush enabling an installer or maintenance person to optimize the flushometer valve for the particular installation's water supply. The handle assembly positioning bushing thus provides a method for adjustment by rotating to either increase or decrease the gallons per flush, depending upon the direction and angle the handle assembly positioning bushing is rotated. In one embodiment, the handle assembly positioning bushing has scribed on it various indicators so the degree of rotation can be correlated to the flushing performance of the bowl the skilled craftsman views and hears.

The invention takes a standard handle known in the art and positions and secures the handle within the handle opening in an offset manner. One embodiment further matches the handle adjustment with an appropriate internal kit and by adjustment of the control stop, balances the water flow and amount to a fixture during the various phases of the flush cycle. Between the handle adjustment, kit modification, and stop adjustment the field technician now has a complete set of adjustments to dial in a fixture for maximum water savings and maximum evacuation performance.

These and other advantages and features of the invention, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

FIGS. 6A and 6B illustrate a flush valve assembly with a handle assembly positioning bushing positioned such that the handle assembly is in a "lowered" position.

FIGS. 7A and 7B illustrate a flush valve assembly with a handle assembly positioning bushing positioned such that the handle assembly is in a "raised" position.

DETAILED DESCRIPTION

Certain embodiments of the invention provide the ability to "dial" flush volumes easily in the field and supplying a reference to correlate the adjustment actually seen by the installer while making incremental hydromechanical modifications to the flushometer to visually effect the fixture flushing efficiency. The present invention adjusts the position a flushometer handle assembly relative to a valve member 16 thereby allowing for control of the venting time of the valve member 16. In one embodiment, the adjustability provided will also allow a service person to be able to service the valve in the future with "standard" drop in repair kits, and "standard" handle kits. Certain embodiments provide for adjusting the flushometer to account for the operating system constraints present within a building structure that otherwise cause the flushometer to sub optimally perform. The adjustment of the flushometer can be made before the flushometer is put into service and can be made with instruments or with visual acumen by viewing and listening to the fixture evacuation. In one embodiment, the flushometer (and the fixture to which it is in communication) is calibrated to the upstream system water delivery system and the downstream fixture performance. That calibration, once set, is only adjustable by removing the handle, thus typically preventing unauthorized adjustments. This in turn can save much water that otherwise may be lost to adjustment inaccuracies.

Figure 1:
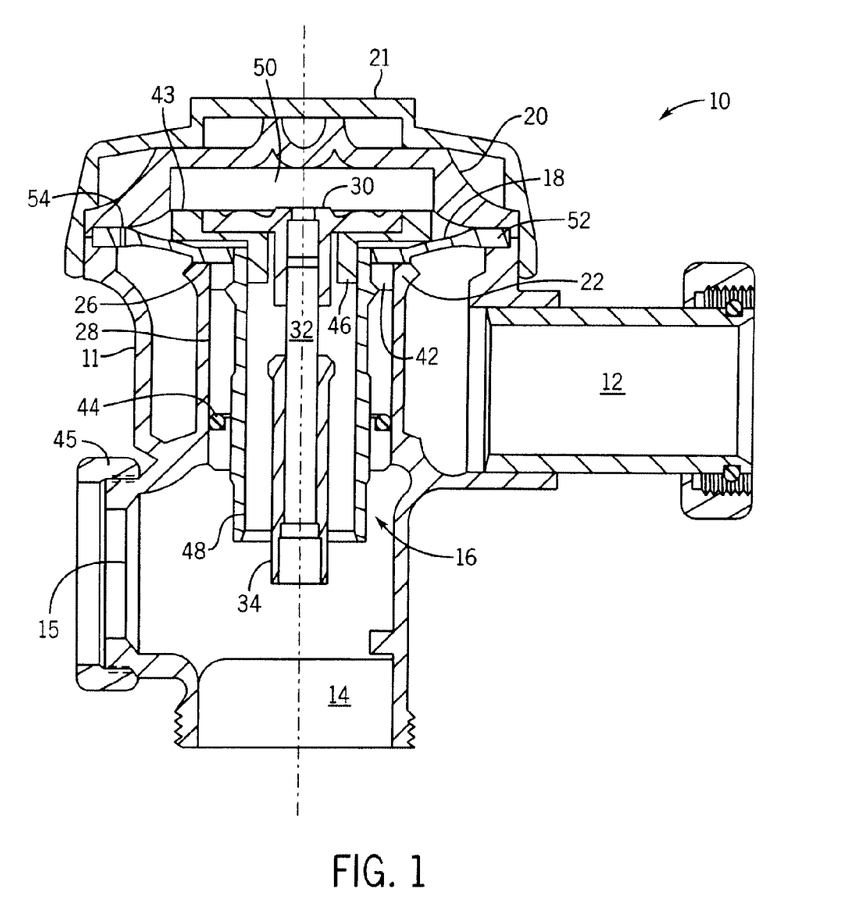
FIG. 1 is a cross sectional view of a flush valve assembly body.
Figures 6A, 6B:
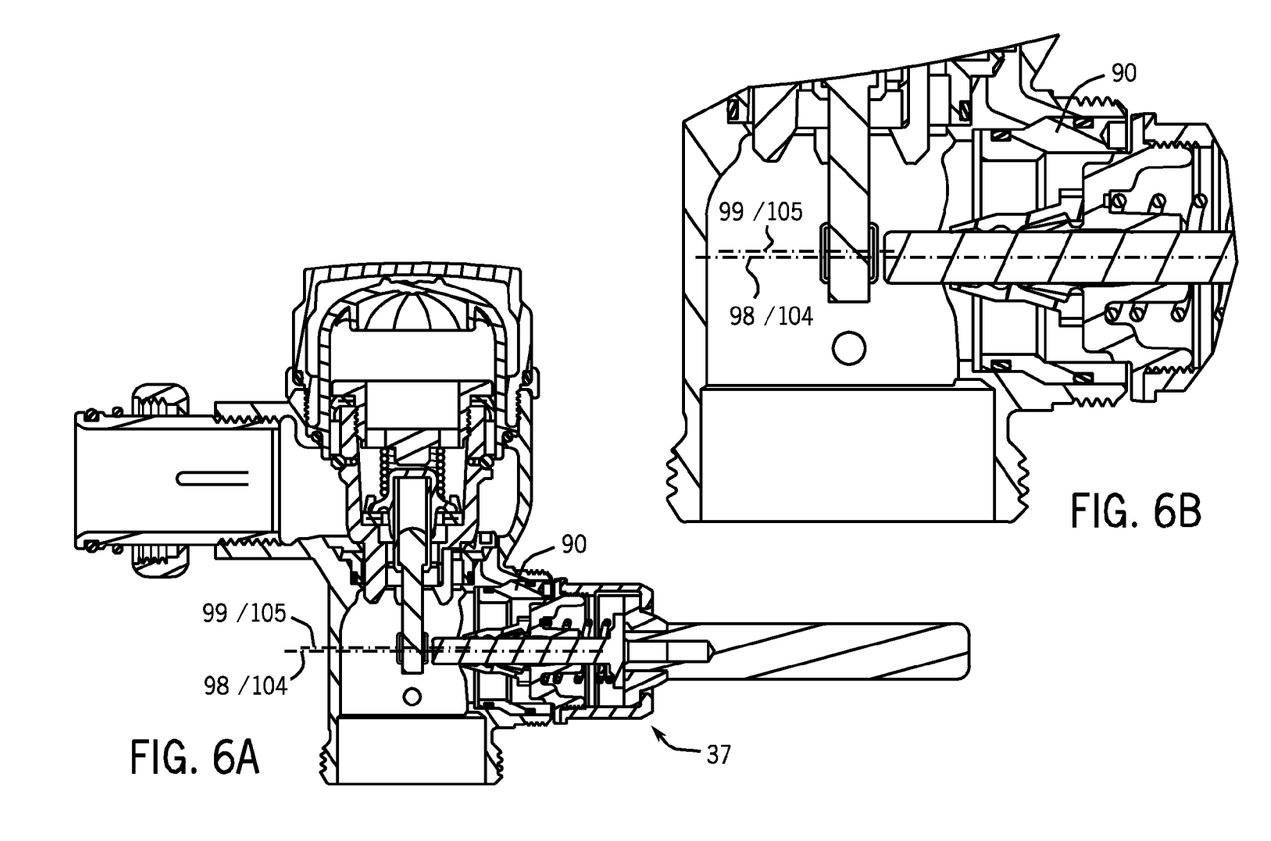
FIG. 6A illustrates a cross sectional view of the flush valve assembly.
FIG. 6B illustrates a close-up partial sectional view highlighting the orientation of the handle assembly, the handle opening, the valve stem and handle assembly positioning bushing.
Figures 7A, 7B:
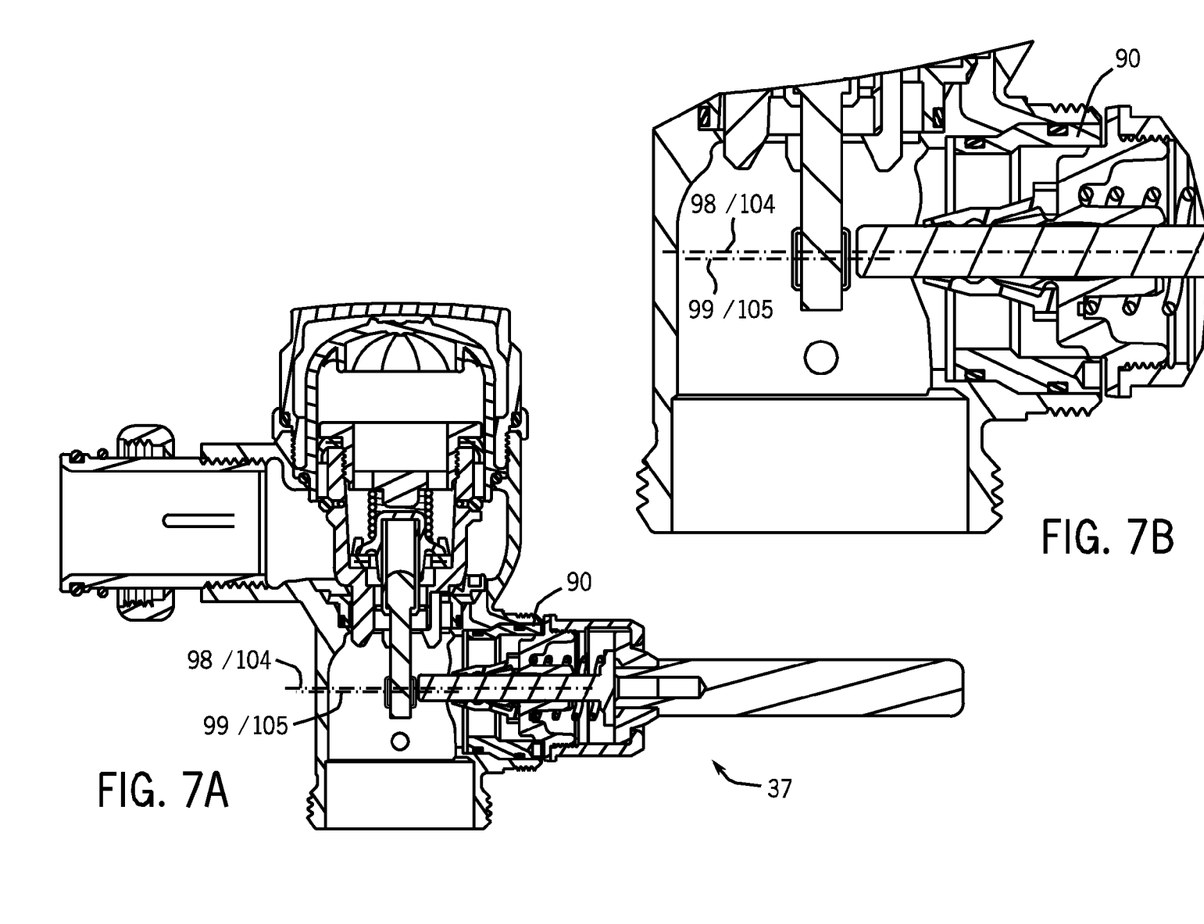
FIG. 7A illustrates a cross sectional view of the flush valve assembly.
FIG. 7B illustrates a close-up partial sectional view highlighting the orientation of the handle assembly, the handle opening, the valve stem and handle assembly positioning bushing.
Figures 8A, 8B, 8C:
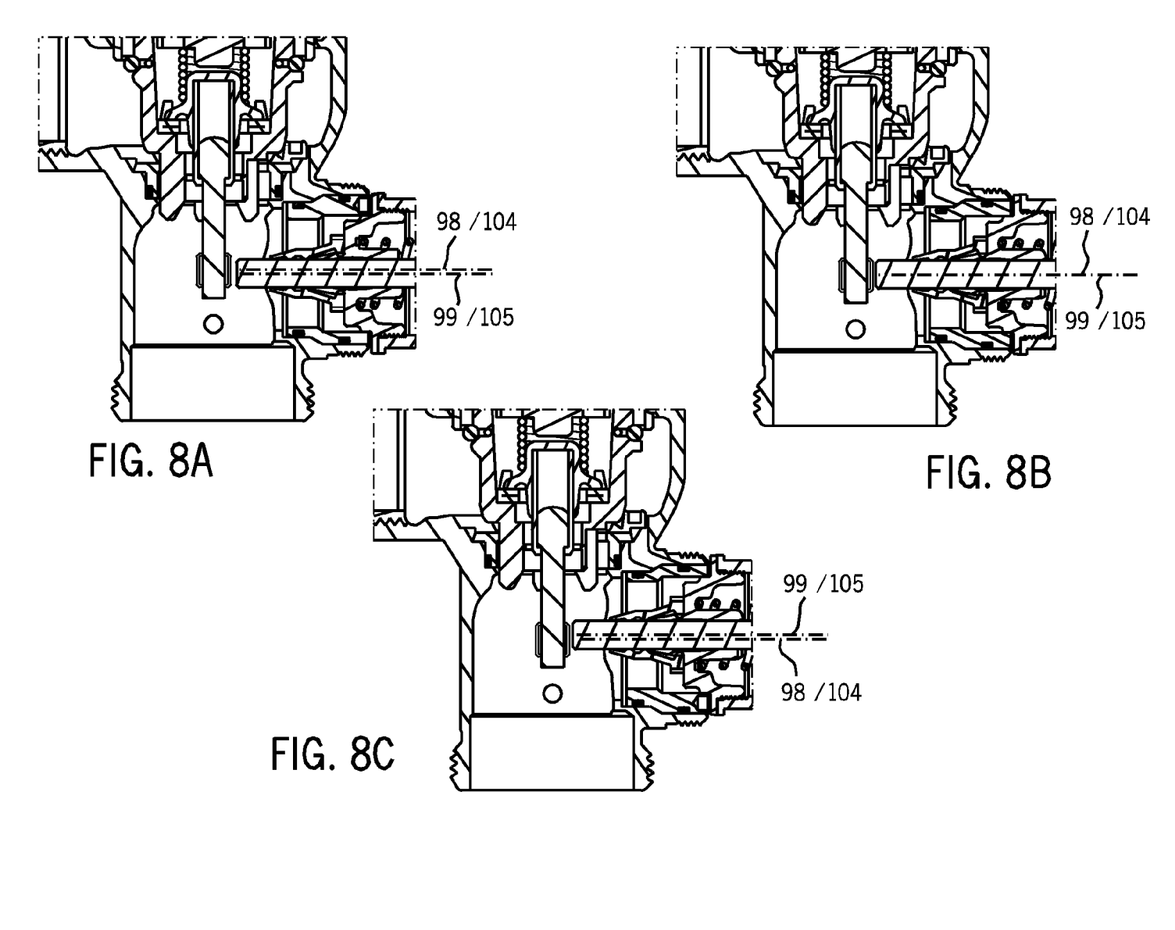
FIGS. 8A, 8B, and 8C illustrate a close-up partial view of the orientation of the handle assembly, handle opening, and valve stem in the upper most raised position (FIG. 8A), the neutral or nominal height position (FIG. 8B), and the lower most position (FIG. 8C)

The present invention may be utilized with known flush valves that utilize a plunger to strike a relief valve stem, including diaphragm flushometers and piston flushometers. The present invention will be described in regard to a general diaphragm type flushometer and is also illustrated in FIGS. 6A and 7A in regard to piston type flushometers. One of ordinary skill in the art would appreciate that certain components of the flushometers described herein may be altered as known in the art, without varying from the spirit and scope of the invention's use with such. As illustrated in FIG. 1, the flush valve system 10 includes a flush valve assembly body 11 having an inlet 12 and an outlet 14. When installed, the inlet 12 is connected to a water supply [not shown] and the outlet 14 is connected to a fixture [not shown] such as a water closet or urinal. A valve member is indicated generally at 16. As previously stated, the valve member 16 may be any of the various assemblies known in the art including diaphragm assemblies (FIG. 1) or piston assemblies (FIGS. 6A and 7A). In one embodiment, the valve member 16 includes a diagram 18 peripherally held to the flush valve assembly body 11 by an inner cover 20. The diaphragm 18 is seated upon a shoulder 22 at the upper end of flush valve assembly body 11 by an inner cover 20. The diaphragm edge 52 of the diaphragm 18 is clamped in this position by the inner cover 20. An outer cover 21 is attached to the flush valve assembly body 11 to hold the inner cover 20 in position.

The valve member 16, in addition to diaphragm 18 and the relief valve 30, includes, in one embodiment, a retaining disk 43, a refill ring 42 and a flow control ring 44. The underside of the retaining disk 43 is attached, such as threadedly, to a collar 46, which in turn is attached, such as threadedly, at its exterior to a chamber flow guide (also referred to as a sleeve by certain prior art) 48 which carries the refill ring 42. The above described assembly of elements firmly holds the diaphragm 18 between the upper face of the refill ring 42 and a lower facing surface of the collar 46. Above the valve member 16 is a pressure chamber 50 (also called a control chamber in the prior art) which maintains the valve member 16 in a closed position when the flush valve system 10 is in a resting state, i.e. not being flushed.

The valve member 16, is closed upon a valve seat 26 formed at the upper end of a barrel 28. The barrel 28 forms the fluid conduit connecting the valve seat 26 with outlet 14. The valve member 16 includes a relief valve 30 having a downwardly extending relief valve stem 32, in one embodiment telescopically carrying a movable relief valve sleeve 34. The handle assembly 37 of the present invention is described in further detail below and illustrated in FIG. 2. In general, the handle assembly 37 includes a handle 38 that actuates a plunger 36, manually or automatically. The sleeve 34 is positioned for contact by the plunger 36 when operated by a handle 38.

As is known in the art, when the handle 38 is operated, the plunger 36 will contact the sleeve 34, tilting the relief valve 30 off its seat on the retaining disk 43. This will permit the discharge of water within the pressure chamber 50 down through the chamber flow guide 48. Water pressure in the inlet 12 will then cause the diaphragm 18 to move upwardly off its seat 26 as force exerted by the water in the inlet 12 is no longer counterbalanced by the force exerted by the water of the pressure chamber 50 on the diaphragm. Movement of the diaphragm 18 off of the seat 26 permits direct communication between the inlet 12 and the outlet 14 through the space between the bottom of the valve member 16 and the seat 26. The raising of the diaphragm 18 (or piston) also lifts the relief valve sleeve 34, allowing it to clear the plunger 36 and return to a vertical, non-tilted position even if the user has held the handle 38 in an actuated position. Once the sleeve 34 clears the plunger 36, the relief valve returns to a seated position on retaining disk 43. As soon as this operation has taken place, the pressure chamber 50 will begin to refill through the filter and bypass orifice 54 in the valve assembly. As flow continues into the pressure chamber 50, the diaphragm will move back down toward its valve seat 26 and when it has reached that position, the flush valve will be closed.

Figure 2:
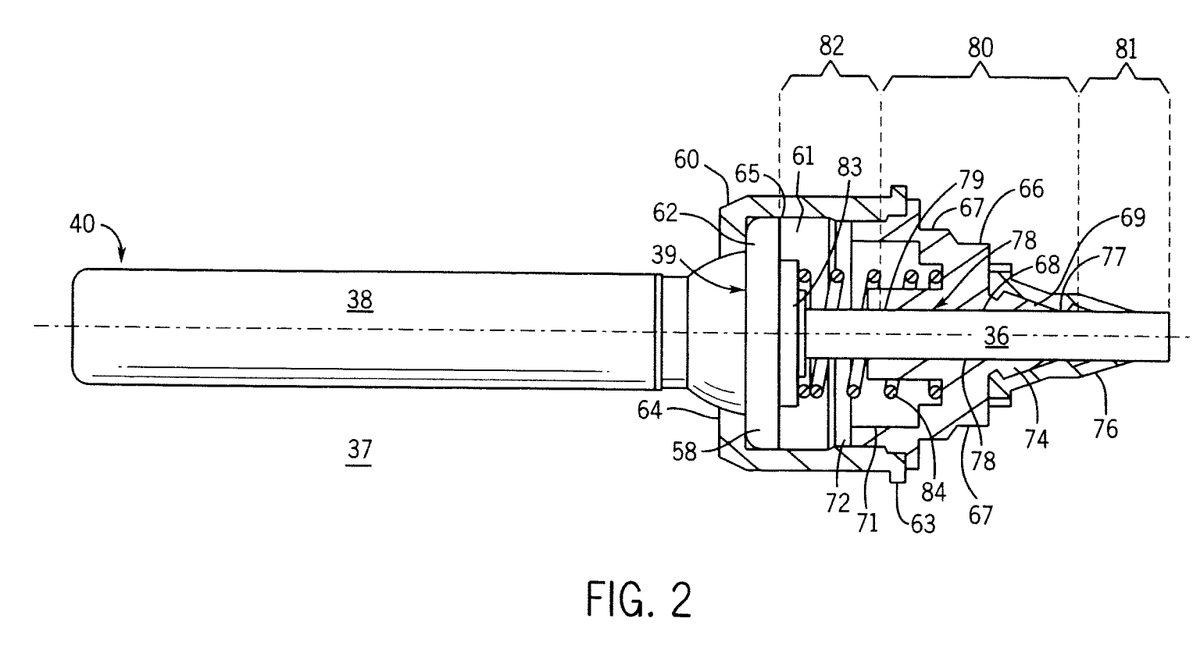
FIG. 2 is a cross sectional view of a handle assembly for use with a flush valve assembly body such as illustrated in FIG. 1.

The handle assembly 37 fits in a handle opening 15 in the flush valve assembly body 11 and is retained therein. In one embodiment, the handle assembly 37 is retained on the flush valve assembly body 11 by a nut 45. The handle assembly 37 includes the handle 38 having an inner end 39 proximate the flush valve assembly body 11 and an outer end 40 distal to the flush valve assembly body 11. The handle 38 includes a face plate 58 at its inner end 39. The face plate 58 is held within a chamber 61 formed by a handle assembly socket 60. In one embodiment, the handle 38 is partially disposed within the handle assembly socket 60. The socket 60 includes an inner end 63 proximate the flush valve assembly body 11 and an outer end 64 distal the flush valve assembly body 11. An inwardly extending flange 62 on the socket's outer end 64 retains the handle face plate 58 within the chamber 61. A covering 65 may line the socket chamber 61 and flange 62. The handle assembly 37 is fitted into the handle opening 15 such that substantially all of the bushing 66 is disposed within the flush valve assembly body 11. In one embodiment, an annular shoulder 67 of the bushing 66 may engage the interior of the handle opening 15 to position the handle assembly 37.

The bushing 66 has a plunger sleeve 68 defining a bore or passage 78 in the handle assembly 37 and an outer skirt 71 joined by a wall 72. The passage 78 having an inner end 77 proximate the flush valve assembly body 11 and an outer end 79 proximate the handle 38. The inner end 69 of the plunger sleeve 68 has, in one embodiment, a beveled nose 74 that mounts a handle packing or seal 76 adjacent the valve stem when installed and through which the plunger 36 slides. The plunger 36 includes a shank 80 and an inner end 81 proximate the flush valve assembly body 11 and an outer end 82 having a head 83 positioned on the outer end 82 of the plunger shank 80. The head 83 interacts with the face plate 58 of the handle 38 such that tilting motion of the handle is converted to lateral motion of the plunger.

In an exemplary embodiment, the handle assembly 37 includes a biasing mechanism 84 (such as a spring). The biasing mechanism 84 provides force to retain the handle 38 in a neutral (i.e. horizontal) position despite the force of gravity. In one embodiment, a compression spring or other suitable biasing device 84 fits between the bushing 66 and the head 82 to urge the plunger 36 into engagement with the face plate 58 of the handle 38 and to bias the handle assembly such that the plunger is retracted away from the valve stem when in a "resting" (i.e. when the handle is not being actuated) state.

In one embodiment, the inner end 63 of the socket 60 is threaded to the bushing 66 such that the handle assembly 37 forms a unitary component. In one non limiting example, the skirt 71 is threaded to the socket 60. Thus, the handle assembly 37 may, in certain embodiments, be changed without replacing the entire flush valve. The handle assembly 37 may include a handle 38 for manual activation or engagable with an automatic actuation mechanism.

Most past attempts at the in-the-field adjustment of flushometer flush volume relied upon simply changing the handle assembly and its interaction with the relief valve gland. This could be caused by either a novel handle mechanism or by inserting a different relief valve. In most of these approaches only a single element of several that affect flushing volume was modified.

Other valve adjustment approaches include an adjustment screw on the exterior of the flushometer that might limit the travel of an internal piston or adjust the effective cross section of a bypass journal.

The present invention utilizes a handle assembly positioning bushing 90 to provide for an efficient field adjustment of the vent timing to achieve maximum water delivery with minimal gallons per flush. Because the handle assembly positioning bushing 90 is independent from the handle assembly 37 or other components, individual parts of the flush valve assembly 10 may be repaired with standard repair kits without adversely impacting the adjustability of the flush volume. In effect, the handle assembly positioning bushing 90 adjusts the flush valve assembly body 11 and not the attaching assemblies, as has been the practice of the prior art.

In one embodiment, the handle assembly positioning bushing 90 requires a larger handle opening than "standard" in the art, such that the handle opening 15 should be machined or otherwise cast as a larger opening to accept the handle assembly positioning bushing 90. However, it should be appreciated that "standard" handle assemblies may be used, typically without modification, with the embodiment of the handle assembly positioning bushing 90.

As mentioned above, the handle assembly 37 is positioned within the handle opening 15. The relative position with respect to the flush valve assembly body 11, and the relief valve stem 32 therein, affects the flush volume. When the handle assembly 37 is positioned lower, i.e. further from the relief valve 30, the plunger 36 will impact the relief valve stem 32 at a lower position resulting in the relief valve 30 being open a shorter time, providing a small flush volume. In contrast, when the handle assembly 37 is positioned higher, i.e. closer to the relief valve 30, the plunger 36 will impact the relief valve stem 32 at a higher position resulting in the relief valve 30 being open a longer time, providing a large flush volume. Thus a central axis of the plunger (illustrated as the same as the central longitudinal axis 104 of the handle assembly 37), which reflects the path of travel of the plunger and its ultimate strike point on the valve stem, is in part determinative of the venting time and flush volume.

In a preferred embodiment, the handle opening 15 of the flush valve assembly body 11 is sized larger than the portion of the handle assembly 37 that is disposable therein. Thus, the handle assembly 37 can be positioned at various vertical heights within the handle opening 15 to provide for various flush volumes. The handle assembly positioning bushing 90 is provided for mating with the flush valve assembly body's handle opening 15 to alter the position of the handle assembly 37 within the handle opening 15. The handle assembly positioning bushing 90 is rotatable in relation to the flush valve assembly body 11, in one embodiment rotatable within the handle opening 15 and in an alternative embodiment, removable from the handle opening 15 such that it can be rotated and placed back within the handle opening 15 in a different orientation. In one embodiment, the handle assembly positioning bushing 90 is best illustrated in FIGS. 3, 4, and FIG. 5.

Figure 3:
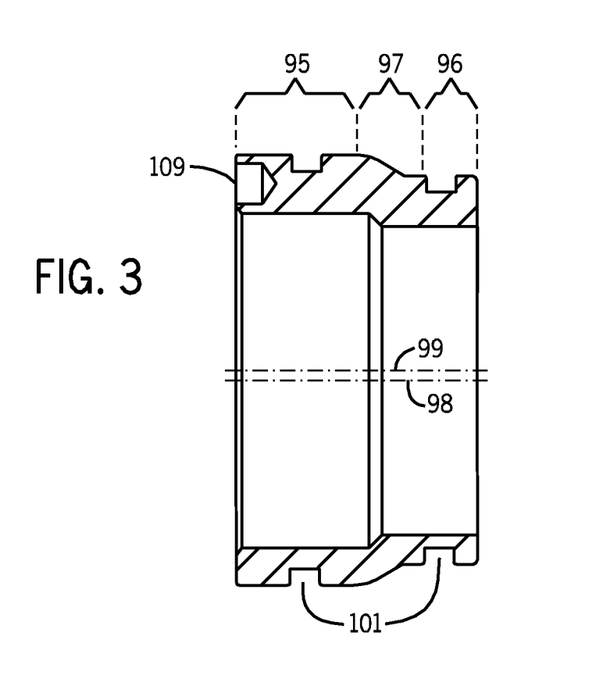
FIG. 3 illustrates the handle assembly positioning bushing in cross-section.

FIG. 3 illustrates the handle assembly positioning bushing 90 in a cross sectional view along the longitudinal axis. The handle assembly positioning bushing 90 substantially forms a cylindrical bushing having an outer surface 91 and inner surface 92 with a varying thickness of material there between. The inner surface 92 defines a passage 93 through the handle assembly positioning bushing 90, the passage 93 configured to receive the handle assembly 37. The outer surface 91 is configured to engage the handle opening 15 of the flush valve assembly body 11. In one embodiment, the handle assembly positioning bushing 90 includes two portions 95, 96 having different circumferences and a transition portion 97 there between, such that the portion having the smaller circumference is disposable within the flush valve assembly body 11. This structure is, in one embodiment, "mirrored" on the inner surface 92 such that the passage 93 includes a portion of larger circumference and a transition to a small circumference portion. In one embodiment, the shape of the passage 93 and the inner surface 92 is adapted to receive the handle assembly 37 in a manner to allow for ease of sealing the inner portion of the flush valve assembly body 11 from the exterior. In one embodiment, the passage 93 is sized so as to receive the bushing shoulder 67 wherein the shoulder rests on the passage 93, allow the location of the passage 93 within the handle opening 15 to dictate the location of the handle assembly 37. It should further be appreciated that the above described use of the first portion with a transition to a second portion having a reduced circumference is described to allow use with many standard flush valve assembly handle openings. However, it should understood that the described handle assembly positioning bushing 90 may have various profiles of the outer surface 91 to allow use in particular handle assembly openings 15, without departing from the described structure herein providing the offsetting of the plunger 36 through use of the handle assembly positioning bushing 90.

Figure 4:
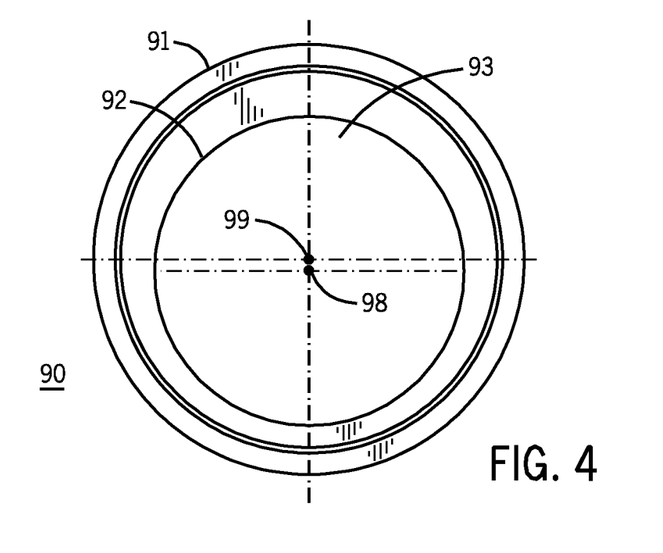
FIG. 4 illustrates the handle assembly positioning bushing in plane view.
Figure 5:
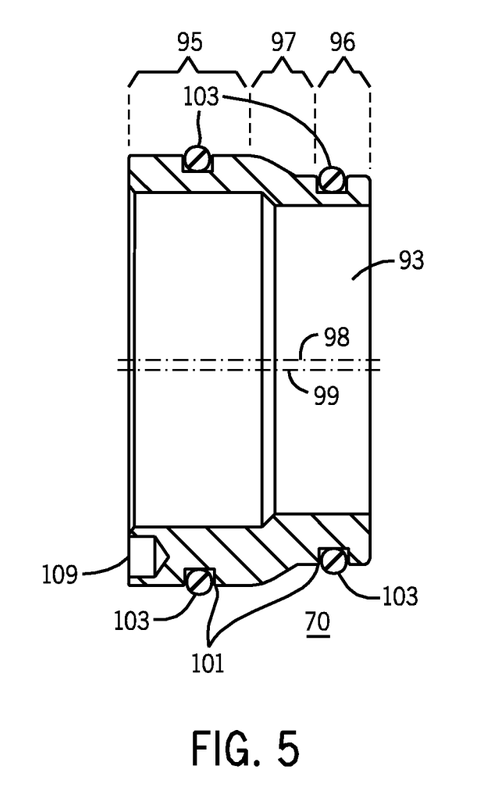
FIG. 5 illustrates an embodiment of the handle assembly positioning bushing including grooves and o-rings for sealing and a notch for adjusting the orientation of the handle assembly positioning bushing.

As can be seen in FIGS. 3 and 4, the passage 93 is offset within the handle assembly positioning bushing 90 such that the passage 93 is eccentric to the outer surface 91 of the handle assembly positioning bushing 90. Thus, a central longitudinal axis 98 of the passage 93 as defined by the inner surface 92 is noncoaxial with the central longitudinal axis 99 of the entire handle assembly positioning bushing 90 as defined by the outer surface 91. FIG. 3 illustrates the noncoaxial nature of these central longitudinal axes 98, 99.

FIGS. 6A, 6B, 7A, 7B, 8A, 8B, and 8C illustrate the relative central axes of components of the flush valve assembly to highlight the impact of the handle assembly positioning bushing 90 upon the flush volume. The handle assembly positioning bushing passage's 93 central longitudinal axis 98 is substantially coaxial with the central longitudinal axis 104 of the handle assembly 37, as the handle assembly 37 is disposed within the inner passage 93 in a fitted manner as described above for one embodiment having shoulder 67 engaging the handle opening 15 and bushing 90. It should be appreciated that although the passage's central longitudinal axis 98 is non coaxial with the handle opening's central longitudinal axis 99, the central longitudinal axis 105 of the entire bushing 90 as determined from its outer surface 91 is, in certain embodiments, substantially coaxial with the handle opening central longitudinal axis 99. When the handle assembly 37 is seated within the handle opening 15, the central longitudinal axis 104 of the handle assembly 37, and notably the plunger 36, is noncoaxial with the central longitudinal axis 99 of the handle opening 15. Thus, rotation of the handle assembly positioning bushing 90 will cause the relative positions of the central longitudinal axis 98 of the passage 93 (and of the axis 104 of the handle assembly 37 affixed partially therein) to rotate about the central longitudinal axis 99 of the handle opening 15 (and of the axis 105 of the handle assembly positioning bushing 90).

It should be appreciated, that in one embodiment, the venting time of the flush valve assembly is altered in accordance with sine law. The "angle" in the sine law is an angle defined by the bushing passage central longitudinal axis 98 and a horizontal plane (not illustrated) passing through the central longitudinal axis 99 of the handle opening 15. The relative position of the handle assembly positioning bushing 90 with respect to the flush valve assembly body 11 will result in a different position of the bushing passage central longitudinal axis 98, in one embodiment all of the possible locations of the bushing passage central longitudinal axis being envisioned by the circumference of a circle with the handle opening central longitudinal axis 99 passing through the center thereof. Thus, when the bushing passage central longitudinal axis 98 is positioned, by rotating the handle assembly positioning bushing 90, within the handle opening central horizontal plane (See, e.g., FIG. 8B), the venting time will be substantially the same as if the handle assembly positioning bushing 90 where not present. However, when the bushing passage central longitudinal axis 98 is at its apex (See, e.g., FIG. 8A) above the handle opening central longitudinal axis, i.e. when the angle is 90 degrees, the venting time will be at a maximum. Conversely, when the bushing passage central longitudinal axis 98 is at its nadir (See, e.g., FIG. 8C) below the handle opening central longitudinal axis 99, i.e. when the angle is −90 degrees, the venting time will be at a minimum. Thus, the handle assembly positioning bushing 90 results in a possible maximum and minimum adjustment, and a range there between, to the flush volume though the adjustment of the handle assembly's 37 position.

In one embodiment, the passage 93 in the handle assembly positioning bushing 90 offsets the central longitudinal axis 104 of the handle assembly 37 by a few thousandths of an inch. It will be appreciated that the offset distance will, in the embodiment described above, reflect the radius of the circle defined by the possible locations of the handle assembly central longitudinal axis 104. Thus, at the apex the plunger 36 would strike the stem 32 a distance "x" above the central longitudinal axis 99 of the handle opening 15. When positioned at the nadir, the plunger 36 will strike at a distance "x" below the central longitudinal axis 99 of the handle opening 15. When the handle assembly central longitudinal axis 104 is in the horizontal plane of the handle opening central longitudinal axis, it should be appreciated that the plunger 36 will strike the valve stem 32 at approximately the same vertical position as the central longitudinal axis 99, but shift to the side by the distance x. It will be appreciated that because the plunger 36 must be able to strike the valve stem 32 sufficiently to unseat the relief valve 30, the amount of offset or eccentricity should not be so great that the plunger glances off of or misses entirely the valve stem 32. The degree of adjustment is limited by the variation in plunger position achievable by the rotation of the handle assembly positioning bushing.

Thus, the use of the handle assembly positioning bushing 90 in the handle opening 15 in flushometer body 11 allows precise adjustment of the handle assembly central longitudinal axis (and specifically that of the plunger) 104 to the relief valve 30 of the body 11, based upon field flushing samples of a particular bowl hydraulics (central longitudinal axis). The flush valve assembly body adjustments while easily performed by a skilled tradesman are then secured safely inside the assembly to remain unchanged until requiring such future change by the skilled tradesman.

In one embodiment, the handle assembly positioning bushing 90 is provided with sealing mechanisms to provide a water-tight seal between the exterior of the flush valve assembly body 11 and the interior. FIG. 5 illustrates one such embodiment. One or more grooves or annular recesses 101 are provided in the handle assembly positioning bushing 90. Sealing material, such as o-rings 103, or other conventional sealing materials, can be disposed partially within the annular recesses 101 to provide a sealing arrangement.

In one embodiment, the position of the handle assembly positioning bushing 90 can be secured so as to prevent rotation of the handle assembly positioning bushing 90. Thus, the volume of water for a flush cycle will remain relatively constant, all other things being equal. A mechanism may be provided for adjusting the handle assembly positioning bushing 90, preferably requiring removal of the handle assembly 37 so as to make the adjustment mechanism unavailable to typical commercial users. In one embodiment, illustrated in FIGS. 3 and 5, a notch 109 is provided on a surface of the handle assembly positioning bushing 90 that faces "outward" from the flush valve assembly body 11 to provide both a visual indication of the orientation of the eccentricity as well as to provide a point of engagement for a tool to rotate the handle assembly positioning bushing 90. It should be appreciated that one advantage provided by certain such embodiments is that the mechanism for adjusting the flush volume is secured behind the handle assembly 37 when the fixture is operable and thus provides no external indication that may cause tampering or other undesired changes to the fixture.

Figure 9:
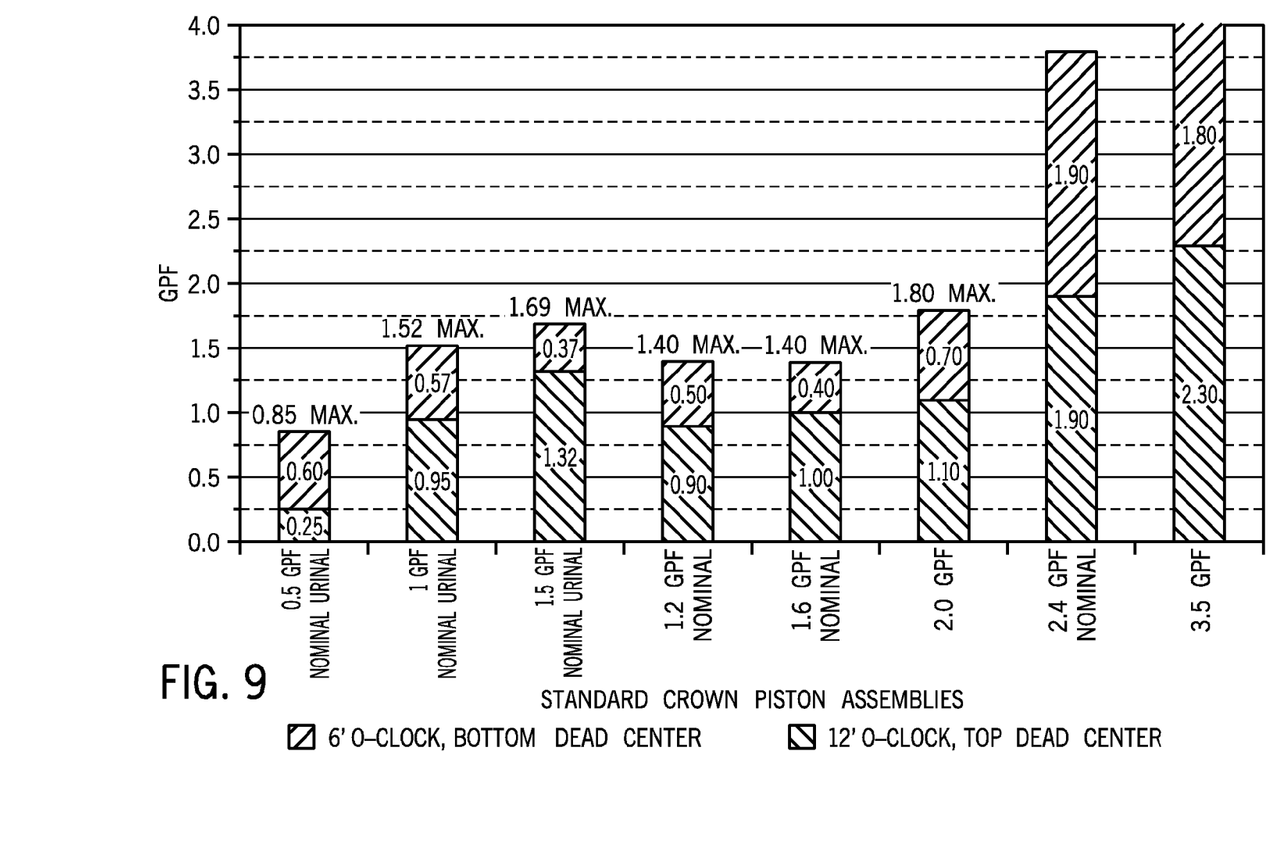
FIG. 9 illustrates the gallons per flush results for embodiments of a water closet and a urinal at varying orientations of the handle assembly positioning bushing.

FIG. 9 illustrate the gallons per flush results for embodiments of a water closet and a urinal at varying orientations (0 and 180 degrees of rotation) of the handle assembly positioning bushing 90. As can be seen, rotation of the handle assembly positioning bushing 90 from a start position (designated 0 degrees) to a position 180 degrees therefrom results in a reduced flush volume. The 0 degree position of the depicted embodiments corresponds to an orientation of the handle assembly positioning bushing 90 placing the handle assembly 37 at a "raised" position and the 180 degree position corresponds to a "lowered" position of the handle assembly 37 within the opening 15.

It is known by those skilled in the art that simply changing the venting time will not always achieve maximum water delivery as much as it will achieve a different overall gallon per flush. It is also known by those skilled in the art that altering vent timing alone may have diminishing effectiveness as a singular change for affecting flush volume. If a balancing of the water to the fixture during the flush is required because of the volume change, more adjustment to the flushometer valve may be necessary. The described adjustment to venting time using the handle assembly positioning bushing 90 may be used in combination with "drop-in" kits that provide a different relief valve, a handle assembly having a different "throw" of the plunger, and adjustable control stops to provide large continuum of possible adjustments to the flush volume and flush profile.

If a different distribution of water during the flushing cycle is required (i.e., more or less water at a certain time in the short flush cycle), this invention anticipates beyond only adjusting handle center line height to main seat which affects the vent timing of the control chamber. A different drop in kit, typically containing a flush valve with a different flush profile and/or volume, may also need be introduced in order for the corresponding vent timing to be compatible with the hydraulic bowl needs. FIG. 9 illustrates the use of various different flush valves drop in kits and the resultant impact on the flush volume due to adjustments to the handle assembly positioning bushing 90. Thus, with the use of various drop-in kits in combination with the described handle assembly positioning bushing 90, the distribution of water during the short flushing cycle can be sculpted.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described to explain the principles of the present invention and its practical application to enable one skilled in the art to utilize the present invention in various embodiments and with various modifications as are suited to the particular use contemplated. The features of the embodiments described herein may be combined in all possible combinations of methods, apparatus, modules and systems. References to the invention or the present invention are indicative of certain embodiments of the invention.

What is claimed is:

1. A flush valve assembly comprising;
   a flush valve assembly body having an inlet, an outlet and a handle opening and further including a valve member disposed therein with a stem extended downwardly therefrom such that it is adjacent the handle opening;
   a handle assembly including a handle pivotally mounted to the housing and engagable with the stem via a plunger, the plunger having an outer end for engaging the handle, an inner end for engaging the stem, and a shank there between, the plunger being axially slidable through a passage in a bushing, the bushing securable to a handle assembly socket for retaining the handle and plunger;
   a handle assembly positioning bushing disposable within the handle opening, the handle assembly bushing have an inner passage eccentrically positioned within the handle assembly bushing and adapted to receive the handle assembly, the handle assembly bushing configured to rotate within the handle opening wherein the height of the handle assembly relative to the valve stem is altered as the handle assembly bushing is rotated
   wherein the handle assembly positioning bushing is completely disposed within the handle opening.

2. The flush valve assembly of claim 1, wherein the handle assembly positioning bushing includes an indicia positioned such that the indicia, a handle opening central longitudinal axis, and a interior passage central longitudinal axis define a plane.

3. The flush valve assembly of claim 2, wherein the indicia is a hollowed portion of the handle assembly positioning bushing.

4. The flush valve assembly of claim 3, wherein the hollowed portion is a hole on an annular face of the handle assembly and is configured to receive a tool for rotating the handle assembly positioning bushing within the flush valve assembly body.

5. The flush valve assembly of claim 1, wherein the valve member is a diaphragm type flushometer valve.

6. The flush valve assembly of claim 1, wherein venting time of the flush valve assembly is altered in accordance with sine law with an angle defined by the bushing passage central longitudinal axis and a horizontal plane passing through the central longitudinal axis of the handle opening.

7. A flush valve assembly comprising;
   a flush valve assembly body having an inlet, an outlet and a handle opening and further including a valve member disposed therein with a stem extended downwardly therefrom such that it is adjacent the handle opening;
   a handle assembly including a handle pivotally mounted to the housing and engagable with the stem via a plunger, the plunger having an outer end for engaging the handle, an inner end for engaging the stem, and a shank there between, the plunger being axially slidable through a passage in a bushing, the bushing securable to a handle assembly socket for retaining the handle and plunger;
   a handle assembly positioning bushing disposable within the handle opening, the handle assembly bushing have an inner passage eccentrically positioned within the handle assembly bushing and adapted to receive the handle assembly, the handle assembly bushing configured to rotate within the handle opening wherein the height of the handle assembly relative to the valve stem is altered as the handle assembly bushing is rotated
   wherein the handle assembly positioning bushing is completely disposed within the handle opening;
   an annular groove circumscribed about an exterior of the handle assembly positioning bushing, the annular groove configured to receive a o-ring, the o-ring seated within the annular groove to sealingly engage the flush valve body.

8. The flush valve of claim 7, wherein the handle assembly positioning bushing is completely disposed within the handle opening.

9. The flush valve assembly of claim 7, wherein the handle assembly positioning bushing includes an indicia positioned such that the indicia, a handle opening central longitudinal axis, and a interior passage central longitudinal axis define a plane.

10. The flush valve assembly of claim 9, wherein the indicia is a hollowed portion of the handle assembly positioning bushing.

11. The flush valve assembly of claim 10, wherein the hollowed portion is a hole on an annular face of the handle assembly and is configured to receive a tool for rotating the handle assembly positioning bushing within the flush valve assembly body.

12. The flush valve assembly of claim 7, wherein the valve member is a diaphragm type flushometer valve.

* * * * *